US008282465B2

(12) United States Patent
Giobbi

(10) Patent No.: US 8,282,465 B2
(45) Date of Patent: Oct. 9, 2012

(54) PORTABLE DATA UNIT FOR COMMUNICATING WITH GAMING MACHINE OVER WIRELESS LINK

(75) Inventor: John J. Giobbi, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 984 days.

(21) Appl. No.: 10/630,141

(22) Filed: Jul. 30, 2003

(65) Prior Publication Data

US 2004/0029635 A1 Feb. 12, 2004

Related U.S. Application Data

(60) Division of application No. 09/950,139, filed on Sep. 10, 2001, now Pat. No. 7,147,558, which is a continuation-in-part of application No. 09/534,406, filed on Mar. 22, 2000, now abandoned.

(51) Int. Cl.
*A63F 9/24* (2006.01)
*A63F 13/00* (2006.01)

(52) U.S. Cl. ................ 463/25; 463/16; 463/17; 463/18; 463/19; 463/20; 463/29; 463/40; 463/42; 463/43

(58) Field of Classification Search ................ 463/1, 29, 463/36, 39–43, 16–20, 25; 237/375, 380, 237/381–382, 382.5, 384; 340/5.2, 5.8; 1/8.81
See application file for complete search history.

(56) References Cited

U.S. PATENT DOCUMENTS

| | | | | |
|---|---|---|---|---|
| 4,190,066 | A | 2/1980 | Burnside | |
| 4,636,951 | A | 1/1987 | Harlick | 364/412 |
| 4,764,666 | A | 8/1988 | Bergeron | 235/380 |
| 5,179,517 | A | 1/1993 | Sarbin et al. | 364/410 |
| 5,265,874 | A | 11/1993 | Dickinson et al. | 273/138 A |
| 5,290,033 | A | 3/1994 | Bittner et al. | 273/138 A |
| 5,371,345 | A | 12/1994 | LeStrange et al. | 235/380 |
| 5,429,361 | A * | 7/1995 | Raven et al. | 463/25 |
| 5,451,756 | A | 9/1995 | Holzer et al. | 235/381 |
| 5,470,079 | A | 11/1995 | LeStrange et al. | 273/138 A |
| 5,557,086 | A | 9/1996 | Schulze et al. | 235/380 |
| 5,575,374 | A | 11/1996 | Orus et al. | 194/213 |
| 5,580,310 | A | 12/1996 | Orus et al. | 463/16 |
| 5,674,128 | A | 10/1997 | Holch et al. | 463/42 |
| 5,697,482 | A | 12/1997 | Orus et al. | 194/213 |
| 5,800,269 | A | 9/1998 | Holch et al. | 463/42 |
| 5,833,540 | A | 11/1998 | Miodunski et al. | 463/42 |
| 5,902,983 | A | 5/1999 | Crevelt et al. | 235/380 |
| 5,919,091 | A | 7/1999 | Bell et al. | 463/25 |

(Continued)

FOREIGN PATENT DOCUMENTS

EP 1120757 A2 8/2001

(Continued)

*Primary Examiner* — Peter DungBa Vo
*Assistant Examiner* — Jasson Yoo
(74) *Attorney, Agent, or Firm* — Nixon Peabody LLP

(57) ABSTRACT

A method and arrangement for communicating with a gaming machine is disclosed. The gaming machine includes a first wireless transceiver. A portable data unit includes a second wireless transceiver. In response to positioning the portable data unit in proximity to the gaming machine, without inserting the portable data unit into any portion of the gaming machine, a wireless transmission link is established between the first and second wireless transceivers. The wireless transmission link may, for example, be a radio (RF) link or an infrared (IR) link. Information is transmitted between the portable data unit and the gaming machine via the wireless transmission link for such purposes as cashless gaming, player tracking, game customization, and data transfer.

24 Claims, 3 Drawing Sheets

U.S. PATENT DOCUMENTS

| | | | | |
|---|---|---|---|---|
| 5,923,252 | A * | 7/1999 | Sizer et al. | 340/573.1 |
| 5,967,896 | A | 10/1999 | Jorasch et al. | 463/25 |
| 5,999,808 | A | 12/1999 | LaDue | 455/412 |
| 6,048,269 | A | 4/2000 | Burns et al. | 463/25 |
| 6,050,487 | A | 4/2000 | Bonifas et al. | 235/375 |
| 6,089,982 | A | 7/2000 | Holch et al. | 463/42 |
| 6,099,408 | A | 8/2000 | Schneier et al. | 463/29 |
| 6,110,041 | A | 8/2000 | Walker et al. | 463/20 |
| 6,168,522 | B1 | 1/2001 | Walker et al. | |
| 6,179,457 | B1 | 1/2001 | Simonotti et al. | |
| 6,213,392 | B1 | 4/2001 | Zuppicich | 235/380 |
| 6,234,898 | B1 | 5/2001 | Belamant et al. | 463/25 |
| 6,245,482 | B1 | 6/2001 | Choi et al. | 463/25 |
| 6,264,556 | B1 | 7/2001 | Izawa et al. | 463/25 |
| 6,287,200 | B1 | 9/2001 | Sharma | 463/40 |
| 6,342,010 | B1 | 1/2002 | Slifer | 463/39 |
| 6,354,946 | B1 | 3/2002 | Finn | 463/40 |
| 6,409,602 | B1 | 6/2002 | Wiltshire et al. | 463/42 |
| 6,500,067 | B1 | 12/2002 | Luciano et al. | |
| 6,536,658 | B1 * | 3/2003 | Rantze | 235/375 |
| 6,579,179 | B2 | 6/2003 | Poole et al. | |
| 6,612,928 | B1 | 9/2003 | Bradford et al. | 463/29 |
| 6,645,078 | B1 * | 11/2003 | Mattice | 463/42 |
| 6,709,333 | B1 | 3/2004 | Bradford et al. | 463/29 |
| 6,722,985 | B2 | 4/2004 | Criss-Puszkiewicz et al. | 463/29 |
| 6,752,312 | B1 | 6/2004 | Chamberlain et al. | |
| 6,763,998 | B1 | 7/2004 | Miodunski et al. | |
| 6,846,238 | B2 | 1/2005 | Wells | 463/39 |
| 6,896,618 | B2 | 5/2005 | Benoy et al. | 463/25 |
| 6,908,387 | B2 * | 6/2005 | Hedrick et al. | 463/31 |
| 6,979,264 | B2 | 12/2005 | Chatigny et al. | 463/29 |
| 7,125,335 | B2 | 10/2006 | Rowe | 463/25 |
| 2001/0034257 | A1 * | 10/2001 | Weston et al. | 463/1 |
| 2001/0044337 | A1 | 11/2001 | Rowe et al. | 463/29 |
| 2002/0045476 | A1 | 4/2002 | Poole et al. | 463/25 |
| 2002/0045484 | A1 | 4/2002 | Eck et al. | 463/42 |
| 2002/0068631 | A1 | 6/2002 | Raverdy et al. | 463/42 |
| 2002/0071557 | A1 | 6/2002 | Nguyen | 380/251 |
| 2002/0111213 | A1 | 8/2002 | McEntee et al. | 463/42 |
| 2002/0112026 | A1 * | 8/2002 | Fridman et al. | 709/217 |
| 2002/0142844 | A1 | 10/2002 | Kerr | 463/42 |
| 2002/0184500 | A1 | 12/2002 | Maritzen et al. | 713/170 |
| 2003/0064805 | A1 | 4/2003 | Wells | 463/39 |
| 2003/0092489 | A1 | 5/2003 | Veradej | 463/36 |
| 2003/0131265 | A1 | 7/2003 | Bhakta | 713/202 |
| 2003/0228898 | A1 | 12/2003 | Rowe | 463/25 |
| 2004/0009809 | A1 | 1/2004 | Salerno | 463/25 |
| 2004/0031845 | A1 | 2/2004 | Solomon | 235/375 |
| 2004/0192438 | A1 | 9/2004 | Wells et al. | 463/29 |
| 2004/0192442 | A1 | 9/2004 | Wells et al. | 463/36 |
| 2005/0054438 | A1 | 3/2005 | Rothschild et al. | 463/29 |
| 2005/0077995 | A1 | 4/2005 | Paulsen et al. | 340/5.6 |
| 2006/0040741 | A1 | 2/2006 | Griswold et al. | 463/40 |
| 2006/0046842 | A1 | 3/2006 | Mattice et al. | 463/29 |
| 2006/0076404 | A1 | 4/2006 | Frerking | 235/382 |

FOREIGN PATENT DOCUMENTS

| | | |
|---|---|---|
| WO | WO 98/35309 | 8/1998 |
| WO | WO 01/41892 A2 | 6/2001 |
| WO | WO 02/21377 A1 | 3/2002 |
| WO | WO 02/23491 | 3/2002 |

* cited by examiner

PORTABLE DATA UNIT FOR COMMUNICATING WITH GAMING MACHINE OVER WIRELESS LINK

REFERENCE TO RELATED APPLICATIONS

This application is a divisional of U.S. Application No. 09/950,139, filed Sep. 10, 2001 now U.S Pat. No. 7,147,558, which is a continuation-in-part of U.S. Application No.09/534,406, filed Mar. 22, 2000, now abandoned.

FIELD OF THE INVENTION

The present invention relates generally to gaming machines and, more particularly, to a portable data unit for communicating with a gaming machine over a wireless transmission link for such purposes as cashless gaming, player tracking, game customization, and data transfer.

BACKGROUND OF THE INVENTION

Cashless gaming systems and player tracking systems generally require a player to insert a portable data unit, such as a smart card, magnetic stripe card, ticket, or the like, into a data unit reader at a gaming machine. The portable data unit is first issued to the player by a gaming establishment or other registration authority. The portable data unit may carry monetary or player tracking information directly on the data unit. Alternatively, the gaming machine may be linked to a central host computer that administers accounts for a plurality of players. In this case, the portable data unit may only carry a personal identifier for accessing a player's account at the central host computer. The monetary or player tracking information may be encrypted or unencrypted, depending upon the level of security desired for the application involved.

Heretofore, to communicate with gaming machines, portable data units of the above type have had to be manually inserted by players into data unit readers at the gaming machines. This arrangement suffers from numerous drawbacks. First, the process of retrieving the portable data unit and manually inserting it into a data unit reader can be inconvenient to a player especially if the player wishes to play numerous gaming machines in a relatively short period of time. Second, unless the portable data unit is somehow attached to the player by a string, chain, or the like, a player may forget to remove the portable data unit from a data unit reader upon completion of a gaming session, thereby possibly allowing a subsequent unscrupulous player at that gaming machine to use the data unit for his/her own benefit. Third, data unit readers are often disposed at peculiar locations on gaming machines, such as above a video or mechanical display. This, in turn, requires a player to awkwardly reach for the peculiar location to manually insert the portable data unit. If the portable data unit is attached to a string or the like, it is common for the string to hang over and partially obscure the machine display as the player plays the gaming machine.

Accordingly, a need exists for a portable data unit that can communicate with a gaming machine without inserting the data unit into a data unit reader.

SUMMARY OF THE INVENTION

A method and arrangement for communicating with a gaming machine is disclosed. The gaming machine includes a first wireless transceiver. A portable data unit includes a second wireless transceiver. In response to positioning the portable data unit in proximity to the gaming machine, without inserting the portable data unit into any portion of the gaming machine, a wireless transmission link is established between the first and second wireless transceivers. The wireless transmission link may, for example, be a radio (RF) link or an infrared (IR) link. Information is transmitted between the portable data unit and the gaming machine via the wireless transmission link for such purposes as cashless gaming, player tracking, game customization, and data transfer.

BRIEF DESCRIPTION OF THE DRAWINGS

The foregoing and other advantages of the invention will become apparent upon reading the following detailed description and upon reference to the drawings.

Figure 1:
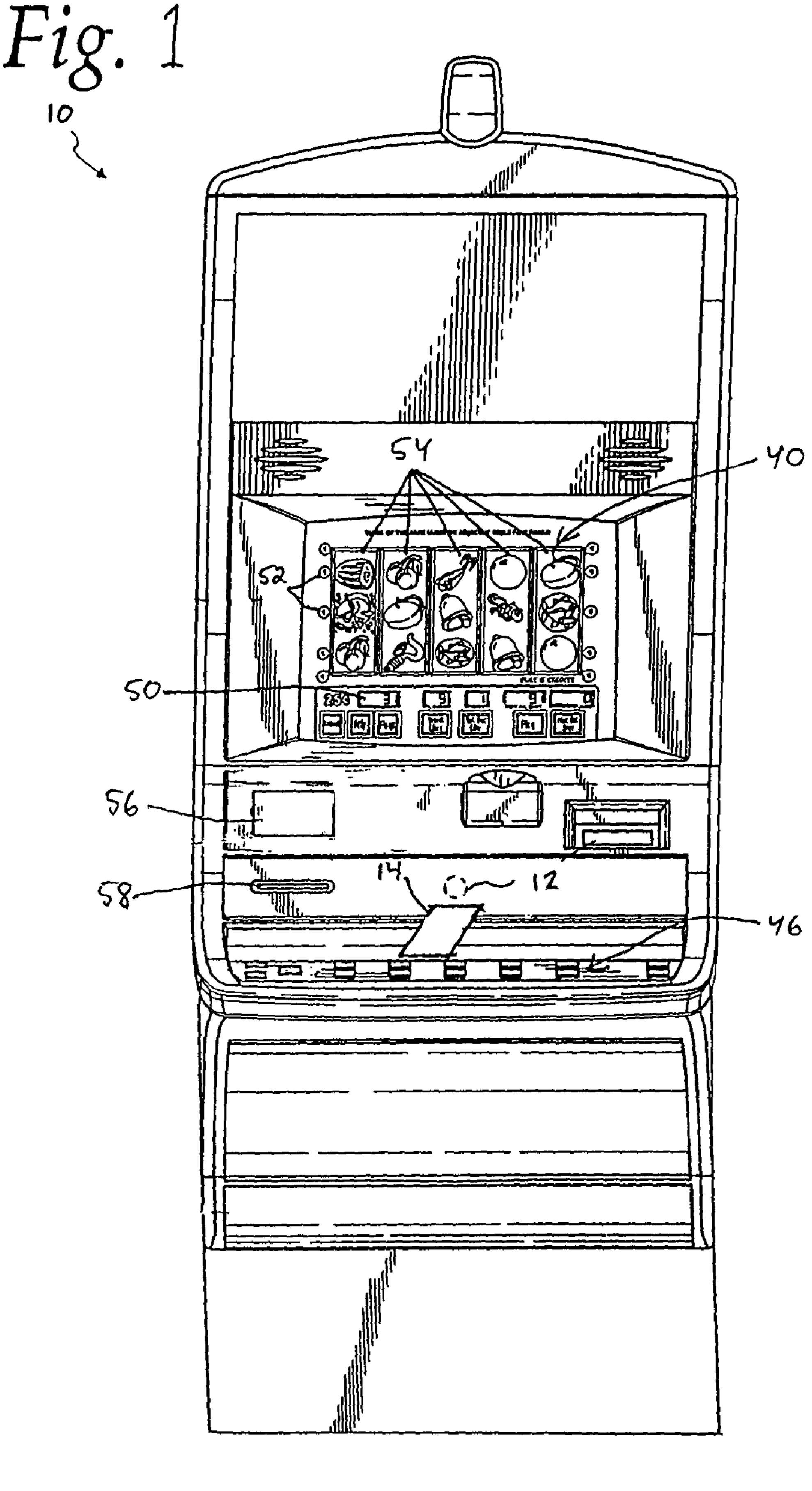
FIG. 1 is a front view of an arrangement for communicating with a gaming machine in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMEENTS

Figure 2:
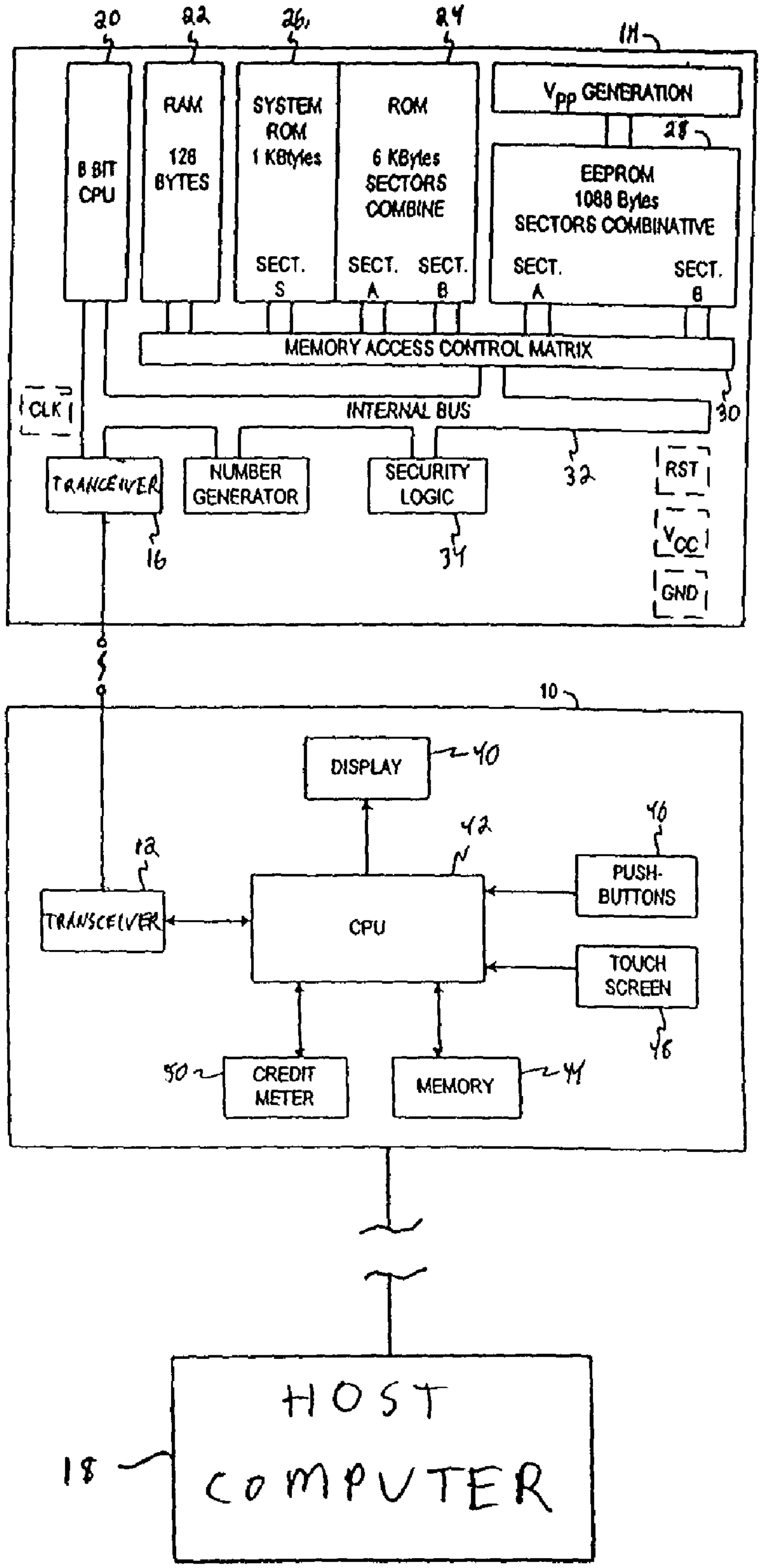
FIG. 2 is a block diagram of the arrangement for communicating with a gaming machine in accordance with the present invention.

Turning now to the drawings, FIG. 1 is a front view of an arrangement for communicating with a gaming machine 10 in accordance with the present invention, and FIG. 2 is a block diagram of the arrangement. The arrangement includes a first wireless transceiver 12 mounted at the gaming machine 10, and a portable data unit 14 including a second wireless transceiver 16 (see FIG. 2). The wireless transceiver 12 is preferably mounted to a front center portion of the gaming machine 10 at a height proximate to a height of a waist of an average standing person. An individual, such as a patron or employee of a gaming establishment, may carry the portable data unit 14 in his or her pocket or on a key, neck, or wrist chain so that the data unit 14 is readily available when needed. A patron may acquire the portable data unit 14 on site from a gaming establishment via an automated dispenser or an attendant station, or may have the data unit 14 shipped to the patron in response to an order placed by mail, telephone, the Internet, or the like. The portable data unit 14 may be shaped as a smart card, key, or the like or may be incorporated in a typical portable device such as a mobile (cell) telephone, watch, necklace, ring, belt buckle, or any other typical device carried by casino patrons.

In response to positioning the portable data unit 14 in proximity to the gaming machine 10, but without inserting the data unit 14 into any portion (e.g., data unit reader) of the gaming machine 10, a wireless transmission link is established (enabled) between the wireless transceivers 12 and 16. The wireless transmission link conveys information between the portable data unit 14 and the gaming machine 10. The wireless transmission link may be a radio (RF) link or an infrared (IR) link.

In one embodiment, the transceivers 12 and 16 are respective radio microchips that communicate over short distances and through obstacles by means of radio waves. The radio microchips preferably conform to the Bluetooth™standard detailed at www.bluetooth.com, which is incorporated herein by reference. The Bluetooth radio microchips operate in the unlicensed ISM band at 2.4 GHz and avoid interference from other signals by hopping to a new frequency after transmitting or receiving an information packet. Bluetooth is a term used to describe the protocol of a short range frequency-hopping radio link between devices containing the radio microchips. These devices, which in this case are the portable data unit 14 and the gaming machine 10, are then termed "Bluetooth-enabled." The radio link replaces a data unit reader or cable that would otherwise be used to connect the portable data unit 14 and the gaming machine 10. The Bluetooth technology is designed to be fully functional even in very noisy radio environments. The Bluetooth technology provides a very high transmission rate and all information is protected by advanced error-correction methods, as well as encryption and authentication routines for the user's privacy. It should be noted, however, that wireless technologies other than Bluetooth may be used to communicate information between the portable data unit 14 and the gaming machine 10.

To establish the wireless transmission link, the portable data unit 14 must be positioned within a predetermined distance of the gaming machine 10 for at least a predetermined period of time. The predetermined distance and period of time may be varied for such different purposes as an attract mode and a play mode. In an attract mode, the predetermined distance and period of time may be set to enable a wireless transmission link with individuals that casually walk by but do not stop at the gaming machine 10. The predetermined distance may be several feet and the predetermined period of time may be less than one second. Upon establishing such an attract mode link, the gaming machine 10 may learn the identity of a passer by through the information on the individual's portable data unit 14 and invite that individual to play the gaming machine 10. In a play mode, the predetermined distance and period of time may be set to enable a wireless transmission link with individuals that demonstrate an intent to play the gaming machine 10 and to disregard individuals who casually walk by the gaming machine 10. In one embodiment, this predetermined distance is no greater than about two or three feet to detect the portable data units 14 of individuals standing in front of the gaming machine 10 but not in front of an adjacent gaming machine. The predetermined period of time is at least five seconds.

As a contingency in the event the wireless transmission link fails, the portable data unit 14 and the gaming machine 10 may be outfitted with respective conventional serial I/O interfaces for establishing a conventional physical link between the data unit 14 and the gaming machine 10. Specifically, instead of positioning the portable data unit 14 in proximity to the gaming machine 10 to attempt to establish a wireless transmission link, the data unit 14 may be inserted into a data unit reader 58 on the gaming machine 10 to establish the conventional physical link. If the portable data unit 14 is a smart card, the data unit reader 58 may be a smart card reader including an entry slot for receiving the smart card.

In one embodiment, the portable data unit 14 is a smart card embedded with a microcontroller and is based on an eight-bit central processing unit (CPU) core 20. The portable data unit 14 includes the following on-chip memories with the following capacities: 128 Bytes of RAM 22, 6 Kbytes of User ROM 24, 1 Kbyte of System ROM 26, and 1088 Bytes of EEPROM 28. If the portable data unit 14 is used to store detailed information of different types (e.g., monetary information, player tracking information, player preferences, casino preferences, and machine data), the number of bytes of in the various memories can be increased to accommodate such information. Both the User ROM 24 and EEPROM 28 can be configured into two sectors. Access rules from any memory section or sector to any other are set up by the User's Memory Access Control Matrix (MACM) 30. This provides protection against interaction between multiple applications running on the portable data unit, or against fraudulent software execution. The CPU 20 is coupled to the MACM 30 by an internal bus 32. The EEPROM 28 preferably employs highly reliable CMOS EEPROM technology with approximately 10 year data retention and 300,000 erase/write cycles endurance. The portable data unit 14 is fully compatible with the ISO standards for smart card applications. Although the portable data unit 14 is illustrated as being in the shape of a card, the data unit 14 can have other shapes capable of housing a microcontroller.

An important advantage of the portable data unit 14 over some other data-carrying mediums, such as magnetic stripe cards, is that it is inherently more secure and therefore less susceptible to fraud. The internal bus 32 is protected from fraudulent use by security logic 34, and the MACM 30 sets up access rules from any memory section or sector. Furthermore, the CPU 20 runs security software that encrypts/decrypts information transmitted between the portable data unit 14 and the gaming machine 10.

The gaming machine 10 is operable to play a game of chance such as mechanical slots, video slots, poker, blackjack, keno, bingo, or roulette. The game of chance may be any game that is played in response to a wager, randomly selects a game outcome from a plurality of possible outcomes, and awards a payoff if the selected game outcome matches predetermined criteria. The gaming machine 10 includes a visual display 40 preferably in the form of a mechanical, dot matrix, CRT, LED, LCD, electro-luminescent, or other type of display known in the art. A touch screen may overlay the display 40. In the illustrated embodiment, the gaming machine 10 is an "upright" version in which the display 40 is oriented vertically relative to a player. Alternatively, the gaming machine 10 may be a "slant-top" version in which the display 40 is slanted at about a thirty-degree angle toward the player of the gaming machine 10.

Referring primarily to FIG. 2, the gaming machine 10 includes a central processing unit (CPU) 42 that executes game software stored in system memory 44. The game of chance is depicted on the display 40. In a video slot game, for example, the player may select a number of pay lines 52 (see FIG. 1) to play and a number of credits to wager via push-buttons 46 or a touch screen 48 overlaying the display 40. The CPU 42 decrements a credit meter 50 by the number of wagered credits. The slot game commences in response to the player pressing a "spin" push-button or touch field or pulling a handle, causing the CPU 42 to set animated reels 54 (see FIG. 1) in motion, randomly select a game outcome using a random number generator (RNG), and then stop the reels to display symbols corresponding to the pre-selected game outcome. In one embodiment, certain of the game outcomes cause the CPU 42 to enter a bonus mode causing the display 40 or a secondary display to show a bonus game.

The system memory 44 stores control software, operational instructions and data associated with the gaming machine 10. In one embodiment, the system memory 44 comprises a separate read-only memory (ROM) and battery-backed random-access memory (RAM). It will be appreciated, however, that the system memory 44 may be implemented on any of several alternative types of memory structures or may be implemented on a single memory structure. In response to a winning outcome (e.g., winning combination of reel symbols along an active pay line) identified on a pay table stored in the system memory 44, the CPU 42 increments the credit meter 50 by a number of credits listed on the pay table for that winning outcome. If the game has a bonus mode, the payoff amounts corresponding to certain outcomes of the bonus game are also stored in the system memory 44.

When the portable data unit 14 is positioned in proximity to the gaming machine 10, the wireless transceivers 12 and 16 establish a wireless transmission link that allows the CPU 20 on the data unit 14 to communicate with the CPU 42 on the gaming machine 10. Such communication may occur for such purposes as cashless gaming, player tracking, game customization, and data transfer.

The amount of information stored on the portable data unit 14 may vary depending upon the storage capacity of the data unit 14 and what is desired for the particular application involved. On the one hand, the gaming machine 10 may be linked to a remote host computer 18 that administers accounts for a plurality of players in an account database. In this case, the portable data unit 14 may only store a personal identifier for accessing detailed information in a player's account at the host computer 18. The personal identifier is associated with the player's account. The detailed information in the player's account may, for example, include monetary information, player tracking information, player preferences, casino preferences, and verification information (e.g., verification code, biometric attribute, etc.). On the other hand, the portable data unit 14 may store detailed information directly on the data unit 14 such that the player's "account" effectively resides on the data unit 14 itself. The detailed information may, for example, include monetary information, player tracking information, player preferences, casino preferences, machine data, and verification information.

In another embodiment, both the portable data unit 14 and the host computer 18 may store some common information as a technique for verifying the contents of the data unit 14. For example, both the portable data unit 14 and the host computer 18 may store a current monetary balance and record of monetary transactions for a player's account identified by the portable data unit 14. If the current monetary balance and transaction record on the portable data unit 14 match the current balance and transaction record in the player's account at the host computer 18, the contents of the portable data unit 14 are considered valid; otherwise, they are not.

If the gaming machine 10 is linked to a host computer 18, it is preferably part of a high-speed network linking the host computer 18 to a plurality of similar gaming machines. The network may encompass a single gaming establishment or multiple gaming establishments. If the network encompasses multiple gaming establishments and is therefore a wide-area network, the gaming machines at each gaming establishment are interconnected by a local-area network. Each local-area network may be an Ethernet using a bus or star topology and supporting data transfer rates of 10, 100, or 1000 megabits per second. Alternatively, each local-area network may be a slower legacy network of the type currently found in many casinos. Each local-area network includes a respective gateway that serves as an entrance to the network. Each gateway is associated with both a router, which knows where to direct a given packet of data that arrives at the gateway, and a switch, which furnishes the actual path in and out of the gateway for a given packet. The gaming machine 10, as well as the other gaming machines in the network, are each assigned a respective permanent identification number for identifying the machine 10 to the host computer 18 and allowing the host computer 18 to address the machine 10. The host computer 18 may either be located in the same gaming establishment as one of the local-area networks or at an offsite location remote from the gaming establishment(s). If the host computer 18 is located in a gaming establishment, the host computer 18 is preferably located in a secure area that can only be accessed by authorized establishment personnel and not patrons.

A player may modify the information associated with the portable data unit 14 at an automated station or at a station operated by a live attendant. In an alternative embodiment, the gaming machine 10 itself may be equipped to serve as an automated station permitting a player to modify the information while at the gaming machine 10. For example, with respect to cashless gaming, to establish or modify the monetary information associated with the portable data unit 14, the player goes to either an automated teller machine (ATM) or an attendant station. In the description below, it should be understood that the player's monetary account may reside on the portable data unit 14 and/or at the central host computer 18. If the player's monetary account resides at the host computer 18, then both the ATM and the attendant station are linked to the host computer 18.

A cashless gaming system and method employing the portable data unit 14 is described in detail below.

Figure 3:
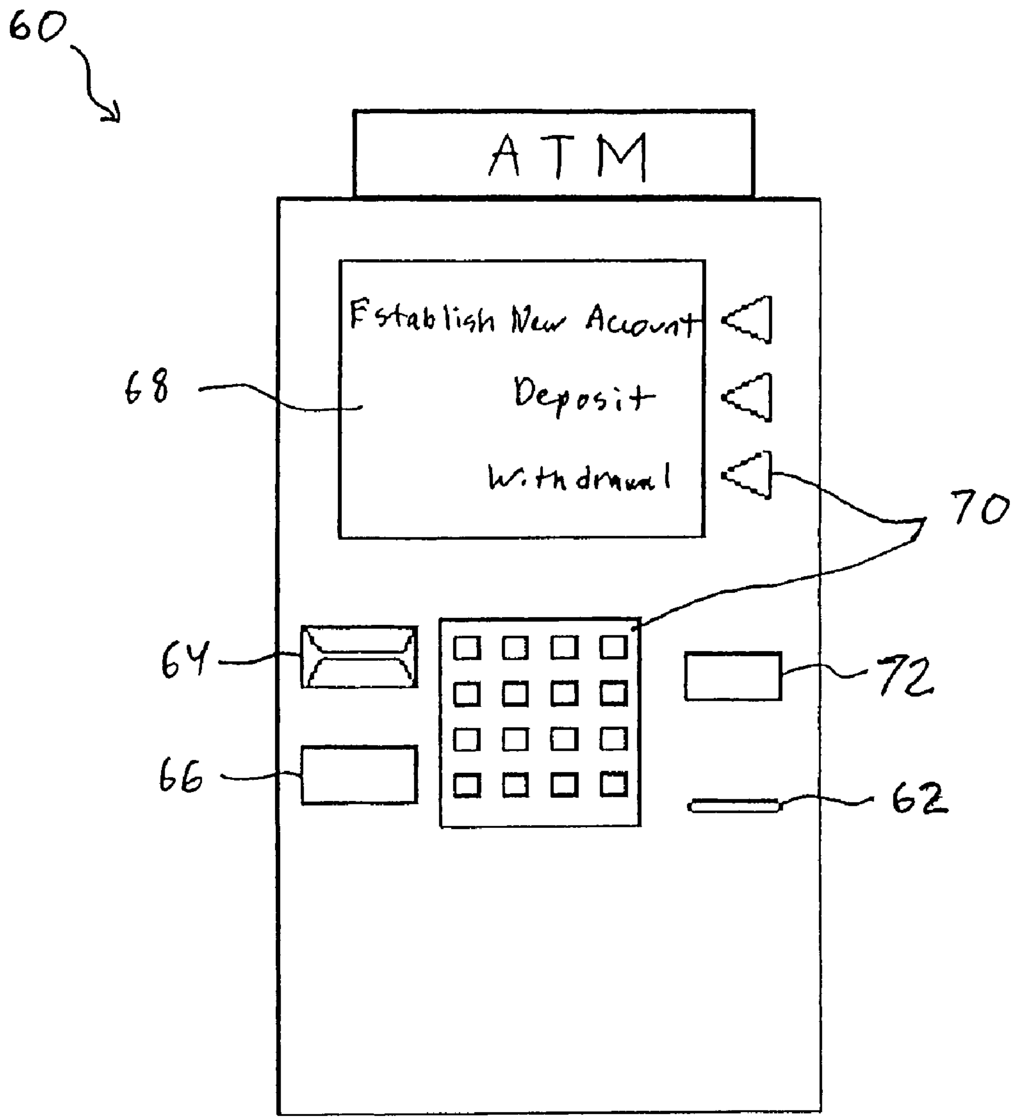
FIG. 3 is an isometric view of an automated teller machine optionally employed in the arrangement.

Referring to FIG. 3, there is shown a front view of an ATM 60. The ATM 60 includes a data unit dispenser 62, a cash acceptor 64, a cash dispenser 66, an instructional display 68, and a push-button user interface 70. In addition to or instead of the user interface 70, a touch screen may be mounted over the instructional display 68. The display 68 initially offers three transaction options: (1) establish a new monetary account, (2) deposit money to an existing account, and (3) withdraw money from an existing account.

In response to selecting option (1), the display 68 instructs the player to insert cash (bills) into the cash acceptor 64 and to press a vend button of the user interface 70 after the desired amount of cash has been inserted. In response to pressing the vend button, the display 68 may prompt the player to enter verification information such as a verification code (e.g., personal identification number (PIN)) and/or a biometric attribute. The ATM 60 may include a biometric measurement device 72 for measuring a biometric attribute of the player. The biometric attribute may, for example, be a fingerprint, a voice sample, or a retinal scan captured with a fingerprint reader, a voice recognition system, and a retinal scanner, respectively. A suitable fingerprint reader is commercially available from Identix Incorporated of Los Gatos, Calif. The fingerprint reader provides adjustable security thresholds so that it can be easily tuned to fit the exact security requirements of the desired application. The player inserts his or her finger into the fingerprint reader which, in turn, electronically or optically captures a forensic-quality fingerprint image directly from the player's finger.

After entering the verification information, the ATM 60 establishes a new monetary account for the player. The verification information is stored with the player's account. The player's account resides either on the portable data unit 14 to be dispensed by the ATM 60 or in an account database at the host computer 18. The player's account initially holds an amount of money corresponding to the amount of cash deposited into the ATM 60 by the player. If the player's account is stored at the host computer 18, the host computer 18 assigns an account identifier to the new account and sends the account identifier to the ATM 60 for storage on the portable data unit 14 to be dispensed. The ATM 60 then dispenses the portable data unit 14 from the data unit dispenser 62.

Once the player's account is established, the player may also utilize the ATM 60 to deposit money to, or withdraw money from, the existing account. Specifically, when the instruction display 68 initially offers the three transaction options noted above, the player selects either option (2) to deposit money or option (3) to withdraw money. In response to selecting either option (2) or (3), the display 68 instructs the player to position his or her portable data unit 14 in proximity to the ATM 60 so that the data unit 14 can communicate with the ATM 60 over a wireless transmission link established between the transceiver 16 in the data unit 14 and a transceiver in the ATM 60. In response to establishing this wireless transmission link, the display 68 prompts the player to enter his or her verification information (e.g., verification code, biometric attribute, etc.).

After receiving the verification information, the ATM 60 verifies the existence of the player's account and the identity of the player. Specifically, if the player's account resides on the portable data unit 14, the ATM 60 compares the entered verification information with the verification information stored with the player's account. If a match does not exist, the ATM 60 rejects use of the portable data unit 14 and informs the player of the problem. If, however, a match exists, the player may proceed to deposit money to (option (2)), or withdraw money from (option (3)), the existing monetary account depending upon which transaction option was initially selected.

If the player's account resides at the host computer 18, the ATM 60 transmits the account identifier on the portable data unit 14 and the entered verification information to the host computer 18. The host computer 18 determines whether or not the account identifier is assigned to any open monetary accounts. If the account identifier is not assigned to any open monetary accounts, the ATM 60 rejects use of the portable data unit 14 and informs the player of the problem. If, however, the account identifier is assigned to an open monetary account, the host computer 18 compares the entered verification information with the verification information stored with the player's account. If a match does not exist, the ATM 60 rejects use of the portable data unit 14 and informs the player of the problem. If, however, a match exists, the player may proceed to deposit money to (option (2)), or withdraw money from (option (3)), the existing monetary account depending upon which transaction option was initially selected.

For a "deposit" transaction (option (2)), the display 68 on the ATM 60 instructs the player to insert cash (bills) into the cash acceptor 64 and to press a vend button of the user interface 70 after the desired amount of cash has been inserted. In response to pressing the vend button, the amount of deposited cash is added to the player's account.

For a "withdrawal" transaction (option (3)), the display 68 on the ATM 60 informs the player as to the amount of money in the player's existing account and instructs the player to enter, via the user interface 70, the amount of money that the player wishes to withdraw from the player's account. The ATM 60 dispenses the requested amount of money via the cash dispenser 66. The amount of withdrawn cash is deducted from the player's account.

The ATM 60 may be designed to allow the player to withdraw any monetary amount (in dollars and cents) in the player's account up to the entire account balance, or to withdraw only a whole number dollar amount in prescribed increments (e.g., $5, $10, $20, etc.). If the ATM 60 allows the player to withdraw any monetary amount up to the entire account balance, the ATM 60 is then equipped with a coin dispenser in addition to the cash dispenser 66. If, however, the ATM 60 allows the player to withdraw only a whole number dollar amount in prescribed increments, the cashless gaming system and method may require the player to obtain any residual amount of money from an attendant station.

Referring back to FIGS. 1 and 2, after the player establishes a new monetary account and deposits money into that account, the player may proceed to play a gaming machine 10 using the money in the player's account. Toward that end, in response to positioning the portable data unit 14 in proximity to the gaming machine 10 so that a wireless transmission link is established therebetween, the machine display 40 prompts the player to enter his or her verification information. If the verification information includes a biometric attribute, the gaming machine 10 may be outfitted with an appropriate biometric measurement device 56 for measuring the biometric attribute.

After receiving the verification information, the gaming machine 10 verifies the existence of the player's account and the identity of the player. Specifically, if the player's account resides on the portable data unit 14, the gaming machine 10 compares the entered verification information with the verification information stored with the player's account. If a match does not exist, the gaming machine 10 rejects use of the portable data unit 14 and informs the player of the problem. If, however, a match exists, the gaming machine 10 accesses the money in the player's account so that the player may proceed to play a game at the gaming machine 10.

If the player's account resides at the host computer 18, the gaming machine 10 transmits the account identifier on the portable data unit 14 and the entered verification information to the host computer 18. The host computer 18 determines whether or not the account identifier is assigned to any open monetary accounts. If the account identifier is not assigned to any open monetary accounts, the gaming machine 10 rejects use of the portable data unit 14 and informs the player of the problem. If, however, the account identifier is assigned to an open monetary account, the host computer 18 compares the entered verification information with the verification information stored with the player's account. If a match does not exist, the gaming machine 10 rejects use of the portable data unit 14 and informs the player of the problem. If, however, a match exists, the gaming machine 10 accesses the money in the player's account so that the player may proceed to play a game at the gaming machine 10.

To access the money in the player's account, the gaming machine 10 may automatically download all the money in the player's account (whether it resides on the portable data unit 14 or at the host computer 18) to the gaming machine 10. Alternatively, the machine display may instruct the player to select an amount of money, up to the entire account balance, to deduct from the player's account and electronically download to the gaming machine 10. The gaming machine 10 converts the amount of downloaded money to an appropriate number of credits. For example, if each credit on the gaming machine 10 is worth 25 cents, the number of credits is equal to the amount of downloaded money divided by 25 cents. The player may proceed to play a game on the gaming machine 10 using the number of credits corresponding to the amount of downloaded money. The gaming machine 10 includes the credit meter 50 depicting the number of credits available for play. For each play, the credit meter 50 is decremented by the number of wagered credits and incremented by the number of credits awarded for a winning outcome.

At the completion of a game session, the player may collect an amount of money corresponding to any credits remaining on the credit meter 50 by pressing a "Collect" (or "Cash Out") button. In response to pressing the "Collect" button, the gaming machine 10 electronically uploads to the player's account (whether it resides on the portable data unit 14 or at the host computer 18) an amount of money corresponding to the number of credits remaining on the credit meter 50. Alternatively, the player may be given the option to have a portion of the money uploaded to the player's account and a remaining portion of the money dispensed as cash or coins from the gaming machine 10. Toward that end, the machine display may instruct the player to select an amount of money, up to the number of credits on the credit meter 50, to upload to the player's account. Any remaining credits are dispensed as cash or coins from the gaming machine 10.

In an alternative embodiment, the actual money in the player's account is not electronically transferred to the gaming machine 10. Rather, while a wireless transmission link exists between the player's portable data unit 14 and the gaming machine 10, the money remains in the player's account but the amount of money is visually represented on the display of the gaming machine 10. In this way, the player is aware of the amount of money in the player's account and available for game play. At the completion of a game session, the amount of money in the player's account is updated to reflect any wins and wagers during the game session. Alternatively, the amount of money in the player's account may be updated after each play, which may be defined as a single wager and an associated outcome.

The wireless transmission link between the portable data unit 14 and the gaming machine 10 preferably must be maintained throughout the gaming session in order to wager with money from the player's monetary account. Alternatively, if the player's account is only accessed at the commencement and completion of a gaming session, the wireless transmission link may only need to be established at these times. If the wireless transmission link is interrupted at any time the link is suppose to exist, the player may be prompted to position the portable data unit 14 in proximity to the gaming machine 10 to re-establish the link. If the wireless transmission link cannot be established despite positioning the portable data unit 14 in proximity to the gaming machine 10, the player may instead establish a more conventional physical link by manually inserting the portable data unit 14 into the data unit reader 58 on the gaming machine 10.

After completing a game session, the player may take the portable data unit 14 to an ATM 60 or an attendant station and withdraw any money remaining in the player's account. The procedure for withdrawing money was described above in connection with the ATM 60. A similar procedure is followed at the attendant station except that the attendant station is operated by a live attendant that assists the player in executing the transaction. The live attendant may merely provide passive instruction or may actively handle the player's portable data unit 14 and money.

As illustrated in FIGS. 1 and 2, the gaming machine 10 includes at least a transceiver 12 for communicating with the portable data unit 14 and is optionally equipped with such traditional money handling devices as a bill validator, a coin acceptor, and a coin hopper. In a first embodiment, the gaming machine 10 only permits cashless gaming and therefore contains none of these traditional money handling devices. If the player uses up all the money in the player's account, the player can take his or her portable data unit 14 to an attendant station or an ATM 60 and deposit additional money into the player's account. In a second embodiment, the gaming machine 10 can serve as an ATM 60 and include bill and/or coin acceptors for the sole purpose of depositing money into the player's account should the player use up the existing money. With this arrangement, the player need not leave the gaming machine 10 to continue playing. In a third embodiment, the bill and/or coin acceptors can additionally be employed to directly load money onto the credit meter 50 of the gaming machine 10.

While the present invention has been described with reference to one or more particular embodiments, those skilled in the art will recognize that many changes may be made thereto without departing from the spirit and scope of the present invention.

For example, the player's account (whether it resides on the portable data unit 14 or at the central host computer 18) may also contain player tracking information, player preferences, and casino preferences.

The player tracking information may include a personal identifier and game play data as disclosed in U.S. Pat. No. 5,179,517 to Sarbin et al., which is incorporated herein by reference in its entirety. The game play data may include an identification of last ten machines played, specific information relating to the games played, and the jackpots and other prizes won by the player. For each denomination (e.g., nickel, dime, quarter, half-dollar, dollar, etc.), the game play data may include data fields for the number of coins played, the number of coins paid out, the number of games played, the number of coins paid by attendants, and the time of play in minutes. Of course, the amount and types of data stored in the player's account may be varied to suit a particular casino operating environment. Based on the player tracking information in the player's account, the central host computer 18 performs calculations to compute bonuses to be awarded to the player when playing a gaming machine 10.

The player preferences generally relate to the values of those parameters that players have selected in establishing their preferred gaming machine configuration. The player preferences may include the preferred game (game type), the preferred configuration of the gaming machine (language, sound options, speed of reel spins, number of coins played per handle pull), and the preferred distribution of awards (payout structure, payout options, form of complimentaries, currency). The casino preferences reflect certain parameters that casinos can adjust according to certain criteria, such as skill level or playing frequency, to maintain the interest of its players. The casino preferences may include hold percentage, complimentary award rate, complimentary award limits, game eligibility (lockout), and other information. Hold percentage indicates a range of hold percentages, such as high, medium, and low. Based on the player preferences and the casino preferences in the player's account, the gaming machine 10 is adapted or configured to such data as disclosed in U.S. Pat. No. 6,110,041 to Walker et al., which is incorporated he entirety.

In addition, the portable data unit 14 may be used by employees of a gaming establishment to collect data relating to gaming machine operation as disclosed in U.S. Pat. No. 5,179,517 to Sarbin et al. For each machine, the machine data may include a machine ID; the number of coins played; the number of coins in the machine's cash box; the number of coins paid out by the machine; the number of games played; the number of coins paid by attendants to players; and such security information as the number of machine door openings, the number of coin hopper jams, the number of blackouts (i.e., interruptions of electrical power to the machine), and the last ten security events such as tilts and illegal pays. Along with the data as described above, appropriate date-time information corresponding to the data may be recorded on the portable data unit 14.

Furthermore, if the portable data unit 14 is incorporated in a portable device such as a mobile telephone or portable internet appliance, the device may link to a financial institution (e.g., bank or credit card company) where the player has an outside account to transfer money to the player's account (whether it resides on the portable data unit 14 or at the central host computer 18) or directly to the gaming machine 10.

Each of these embodiments and obvious variations thereof is contemplated as falling within the spirit and scope of the claimed invention, which is set forth in the following claims.

What is claimed is:

1. A method of operating a gaming terminal, comprising:

establishing a wireless transmission link with a portable data unit carried by an individual, the portable data unit storing information associated with the individual;

transmitting the information associated with the individual to the gaming terminal;

in response to the transmitting changing the operation of the gaming terminal to a first mode associated with the individual or a second mode associated with the individual depending upon at least one of (i) a distance between the portable data unit and the gaming terminal and (ii) a period of time for which the portable data unit is detected as being in the presence of the gaming terminal, the first mode being different from the second mode.

2. A method of operating a gaming machine, comprising:

detecting, via the gaming machine, the presence of a passerby proximate to the gaming machine, the passerby not playing the gaming machine, the detecting including establishing a wireless transmission link between a first wireless transceiver in the gaming machine and a second wireless transceiver disposed in a portable data unit carried by the passerby, the portable data unit including information for allowing an identity of the passerby to be determined;

in response to detecting the presence of the passerby by at least one of detecting the presence of the passerby within a first predetermined distance of the gaming machine or detecting the presence of the passerby for at least a first predetermined period of time, operating the gaming machine in a first mode associated with the passerby; and in response to detecting the presence of the passerby by at least one of detecting the presence of the passerby within a second predetermined distance of the gaming machine or detecting the presence of the passerby for at least a second predetermined period of time, operating the gaming machine in a second mode associated with the passerby, the second mode being different from the first mode, the second predetermined distance being different from the first predetermined distance, the second predetermined period of time being different from the first predetermined period of time.

3. The method of claim 2, further comprising receiving a wager from the passerby.

4. The method of claim 2, wherein operating the gaming machine in a first mode includes inviting the passerby to play the gaming machine.

5. The method of claim 2 further comprising determining the identity of the passerby.

6. The method of claim 5, wherein the operating the gaming machine in a first mode includes inviting the passerby based on the identity of the passerby, to play the gaming machine.

7. The method of claim 2, further comprising encrypting data communicated across the wireless transmission link into ciphered data.

8. The method of claim 2, wherein the operating the gaming machine in the first mode includes attracting the passerby to interact with the gaming machine.

9. The method of claim 8, wherein the attracting the passerby includes the gaming machine conveying a message to the passerby.

10. The method of claim 2, wherein the second predetermined distance is less than the first predetermined distance, and the second predetermined period of time is greater than the first predetermined period of time.

11. A method of operating a gaming machine, comprising:

detecting, via the gaming machine, the presence of a first passerby by at least one of detecting the presence of the passerby within a first predetermined distance of the gaming machine or detecting the presence of the passerby for at least a first predetermined period of time, the passerby not interacting with the gaming machine;

in response to the detecting the presence of the first passerby, modifying the operation of the gaming machine according to an attract mode specific to the first passerby based on first information wirelessly communicated between the gaming machine and a first portable data unit carried by the first passerby;

detecting, via the gaming machine, the presence of a second passerby by at least one of detecting the presence of the passerby within a second predetermined distance of the gaming machine or detecting the presence of the passerby for at least a second predetermined period of time, the second predetermined distance being different from the first predetermined distance, the second predetermined period of time being different from the first predetermined period of time;

in response to the detecting the second passerby, modifying the operation of the gaming machine according to a play mode specific to the second passerby based on second information wirelessly communicated between the gaming machine and a second portable data unit carried by the second passerby.

12. The method of claim 11, further comprising encrypting the wirelessly communicated first information into ciphered first information and encrypting the wirelessly communicated second information into ciphered second information.

13. The method of claim 11, wherein the modifying the operation of the gaming machine according to the play mode includes receiving at the gaming machine a signal indicative of a wager on a game playable by the second passerby on the gaming machine.

14. The method of claim 11, wherein the modifying the operation of the gaming machine according to the attract mode includes inviting the first passerby to interact with the gaming machine.

15. The method of claim 11, wherein the second predetermined distance is less than the first predetermined distance and the second predetermined period of time is greater than the first predetermined period of time.

16. The method of claim 11, wherein modifying the operation of the gaming machine according to the attract mode includes determining the identity of the first passerby through identity information associated with the first passerby's portable data unit.

17. The method of claim 11, wherein the modifying the operation of the gaming machine according to the attract mode includes conveying a message from the gaming machine to the first passerby.

18. The method of claim 11, wherein modifying the operation of the gaming machine according to the play mode includes disregarding individuals with a portable data unit who pass by the gaming machine at greater than for at least one of the second predetermined distance or for less than the second predetermined period of time.

19. A method of operating a gaming terminal, comprising:

in response to wirelessly detecting the presence of a passerby by at least one of detecting the presence of the passerby within a first predetermined distance of the gaming terminal or detecting the presence of the passerby for at least a first predetermined period of time, operating the gaming terminal in a first mode associated with the passerby such that the gaming terminal interacts with the passerby in a first manner; and in response to wirelessly detecting the presence of the passerby by at least one of detecting the presence of the passerby within a second predetermined distance of the gaming terminal or detecting the presence of the passerby for at least a second predetermined period of time, operating the gaming terminal in a second mode associated with the passerby such that the gaming terminal interacts with the passerby in a second manner different from the first manner.

20. The method of claim 19, wherein the first mode includes establishing an attract mode wireless link when a portable data unit carried by the passerby is detected for at least one of within the first predetermined distance of the gaming terminal or detected for at least the first predetermined period of time.

21. The method of claim 20, wherein the second mode includes establishing a play mode wireless link when the portable data unit is detected by at least one of detecting the presence of the passerby within the second predetermined distance of the gaming terminal or detecting the presence of the passerby for at least the second predetermined period of time, the second predetermined distance being less than the first predetermined distance and the second predetermined period of time being greater than the first predetermined period of time.

22. The method of claim 21, wherein in response to operating the gaming terminal in the second mode, disregarding individuals who pass by the gaming terminal by at least one of disregarding individuals who pass by the gaming machine at greater than the second predetermined distance or disregarding individuals who pass by the gaming machine for less than the second predetermined period of time.

23. The method of claim 20, wherein in response to establishing the attract mode wireless link, determining the identity of the passerby through identity information associated with the passerby's portable data unit.

24. The method of claim 20, wherein in response to establishing the attract mode wireless link, the gaming terminal conveys a message to the passerby.

* * * * *